United States Patent
Trammell et al.

(10) Patent No.: US 11,542,723 B2
(45) Date of Patent: Jan. 3, 2023

(54) CONVERTIBLE ACCESS PANEL LATCH ASSEMBLY

(71) Applicant: Johnson Controls Technology Company, Auburn Hills, MI (US)

(72) Inventors: Curtis A. Trammell, Newcastle, OK (US); John L. McElvany, Norman, OK (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 1133 days.

(21) Appl. No.: 16/146,074

(22) Filed: Sep. 28, 2018

(65) Prior Publication Data

US 2020/0087948 A1 Mar. 19, 2020

Related U.S. Application Data

(60) Provisional application No. 62/733,505, filed on Sep. 19, 2018.

(51) Int. Cl.
*E05B 1/00* (2006.01)
*E05B 65/00* (2006.01)
(Continued)

(52) U.S. Cl.
CPC .......... *E05B 1/0007* (2013.01); *E05B 65/006* (2013.01); *F16B 5/0241* (2013.01);
(Continued)

(58) Field of Classification Search
CPC .......... E05B 1/00; E05B 1/0007; E05B 1/003; E05B 3/00; E05B 3/04; E05B 13/005;
(Continued)

(56) References Cited

U.S. PATENT DOCUMENTS 991,363 A * 5/1911 Polsen ................ E05B 65/0811
70/99
6,626,017 B2 9/2003 Herbeck et al.
(Continued)

FOREIGN PATENT DOCUMENTS

DE 4006707 A1 * 9/1991 ............. E05C 3/042
KR 101712812 B1 * 3/2017
WO WO-2018080858 A1 * 5/2018 ........... E05B 15/006

OTHER PUBLICATIONS

Southco; E5 Cam Latches; www.southco.com/E5; pp. 116-133.

*Primary Examiner* — Christine M Mills
*Assistant Examiner* — Yahya Sidky
(74) *Attorney, Agent, or Firm* — Fletcher Yoder, P.C.

(57) ABSTRACT

A latch assembly for a heating, ventilation, and/or air conditioning (HVAC) enclosure includes a latch having a securement portion configured to couple to an access panel of the enclosure and having a rotational portion. The rotational portion has an engagement feature configured to engage with a tool face or a tool receptacle and the rotational portion has a first retainer adjacent to the engagement feature. The rotational portion is configured to rotate relative to the securement portion such that a locking portion of the rotational portion transitions between a closed configuration and an open configuration. The latch assembly includes a handle accessory having a handle engagement driver configured to engage with the engagement feature of the rotational portion along a first linking axis and having a second retainer configured to couple with the first retainer of the rotational portion along a second linking axis, transverse to the first linking axis.

24 Claims, 3 Drawing Sheets

(51) Int. Cl.
*F16B 21/12* (2006.01)
*F24F 13/02* (2006.01)
*F16B 5/06* (2006.01)
*F16B 5/02* (2006.01)
*F16B 21/02* (2006.01)

(52) U.S. Cl.
CPC ............ *F16B 5/0642* (2013.01); *F16B 21/02* (2013.01); *F16B 21/125* (2013.01); *F24F 13/029* (2013.01)

(58) Field of Classification Search
CPC ................ E05B 13/101; E05B 35/008; E05B 2015/1678; E05B 57/00; E05B 65/006; E05B 65/0089; E05B 47/0676; E05B 55/06; E05C 3/00; E05C 3/004; E05C 3/02; E05C 3/04; E05C 3/041; E05C 3/042; E02D 29/1427; Y10T 292/20; Y10T 292/225; Y10T 292/1041; Y10T 292/1083; Y10T 292/1084; Y10T 292/1085; Y10T 292/1092; Y10T 292/0086; Y10T 292/0887; Y10T 292/0891; Y10T 70/558; Y10T 70/5549; Y10T 70/5558; Y10T 70/5589; Y10T 70/5597; Y10T 70/5606; Y10S 292/11; Y10S 292/27; Y10S 292/30; Y10S 292/63
See application file for complete search history.

(56) References Cited

U.S. PATENT DOCUMENTS

| | | |
|---|---|---|
| 7,819,443 B2 | 10/2010 | Ryan |
| 9,410,569 B2 | 8/2016 | Gray |
| 2002/0060456 A1* | 5/2002 | Linares .................. E05C 3/145 292/103 |
| 2007/0120374 A1* | 5/2007 | Cotton .................. E05B 1/0092 292/66 |
| 2014/0319854 A1 | 10/2014 | Lee |
| 2017/0335880 A1 | 11/2017 | Prevost |
| 2018/0155969 A1* | 6/2018 | Mislak .................. E05B 65/006 |
| 2020/0300000 A1* | 9/2020 | Alvarez Cavazos . E05B 35/008 |

* cited by examiner

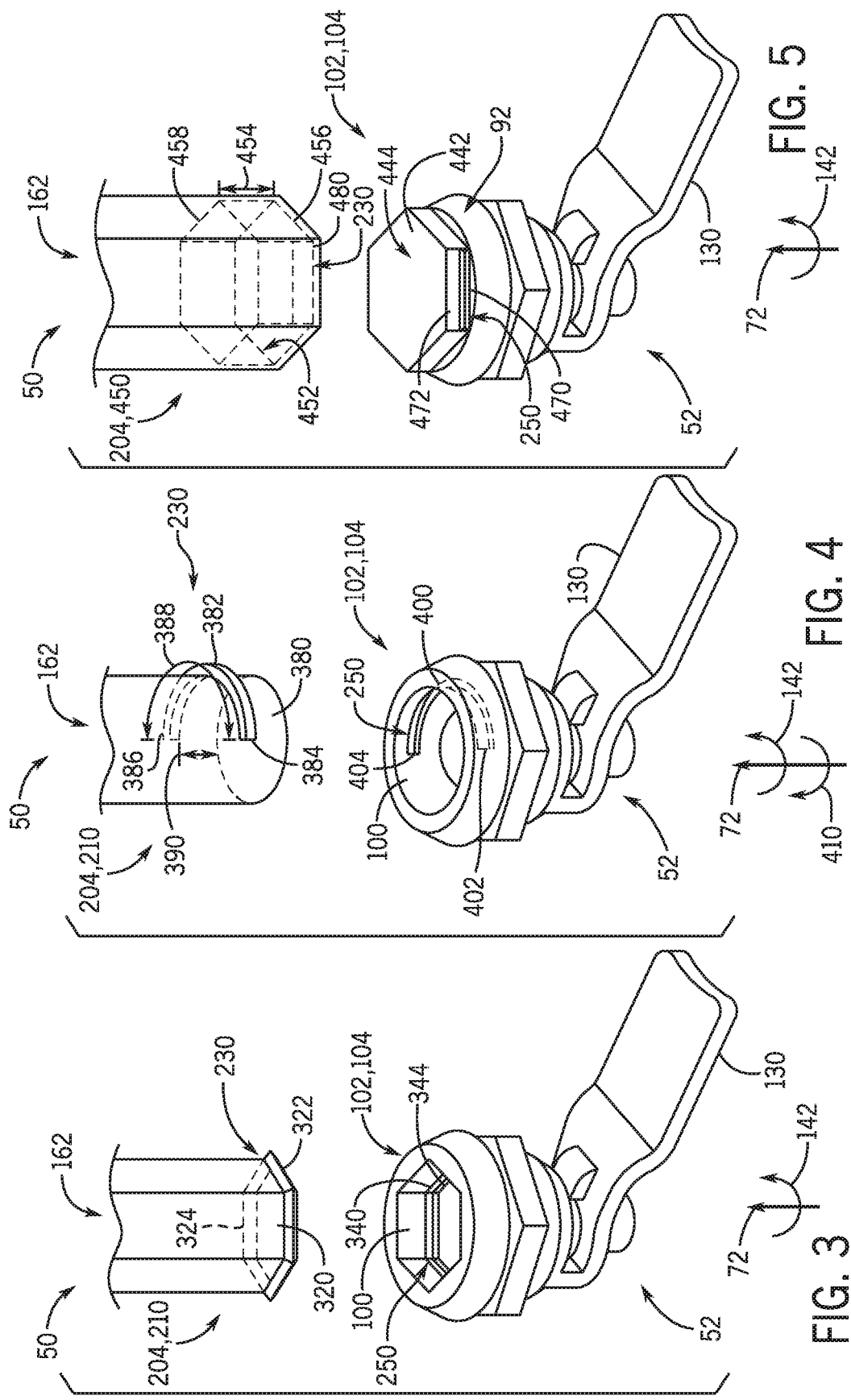

CONVERTIBLE ACCESS PANEL LATCH ASSEMBLY

CROSS REFERENCE TO RELATED APPLICATION

This application claims priority from and the benefit of U.S. Provisional Application Ser. No. 62/733,505, entitled "CONVERTIBLE ACCESS PANEL LATCH ASSEMBLY," filed Sep. 19, 2018, which is hereby incorporated by reference in its entirety for all purposes.

BACKGROUND

The present disclosure relates generally to heating, ventilation, and/or air conditioning (HVAC) systems, and more particularly, to latch assemblies for enclosures of HVAC systems.

A wide range of applications exists for HVAC systems. For example, residential, light commercial, commercial, and industrial systems are used to control temperatures and air quality in indoor environments and buildings. Such systems may be dedicated to either heating or cooling, although systems are common that perform both of these functions. Very generally, these systems operate by implementing a thermal cycle in which fluids are heated and cooled to provide air flow at desired temperature to a controlled space, typically the inside of a residence or building. For example, a refrigerant circuit may circulate a refrigerant through one or more heat exchangers to exchange thermal energy between the refrigerant and one or more fluid flows, such as a flow of air.

HVAC systems and components, including heat exchangers, air handlers, heat pumps, and air conditioning units used to provide conditioned air to conditioned environments, may be disposed within enclosures. In some applications, the enclosures of the HVAC units are accessible without tools, such as by turning a handle on an access panel. In other applications, the enclosures of the HVAC units are locked to restrict access to the HVAC units, where a tool or key is utilized to open to the enclosure. Based on the unique specifications for each HVAC unit, access panel latches may be individually selected, complicating the manufacturing process for the HVAC units. Accordingly, it may be desirable to employ more versatile access panel latches on the enclosures.

SUMMARY

In one embodiment of the present disclosure, a latch assembly for a heating, ventilation, and/or air conditioning (HVAC) enclosure includes a latch having a securement portion configured to couple to an access panel of the enclosure and having a rotational portion. The rotational portion has an engagement feature configured to engage with a tool face or a tool receptacle and has a first retainer adjacent to the engagement feature. The rotational portion is configured to rotate relative to the securement portion such that a locking portion of the rotational portion transitions between a closed configuration and an open configuration. The latch assembly includes a handle accessory having a handle engagement driver configured to engage with the engagement feature of the rotational portion along a first linking axis and having a second retainer configured to couple with the first retainer of the rotational portion along a second linking axis, transverse to the first linking axis.

In another embodiment of the present disclosure, a latch assembly for a heating, ventilation, and/or air conditioning (HVAC) enclosure, includes a latch having a securement portion configured to couple to an access panel of the enclosure and a rotational portion having an engagement receptacle and a retainer groove defined in a surface of the engagement receptacle. The rotational portion is configured to rotate relative to the securement portion such that a locking portion of the rotational portion transitions between a closed configuration and an open configuration between a closed configuration and an open configuration. The latch assembly includes a handle accessory having a handle portion with an engagement extension protruding therefrom. The engagement extension has a retainer extension protruding therefrom. Additionally, the engagement extension is configured to engage with the engagement receptacle along a first linking axis. The retainer extension is configured to couple with the retainer groove along a second linking axis, transverse to the first linking axis.

In a further embodiment of the present disclosure, a latch assembly for a heating, ventilation, and/or air conditioning (HVAC) enclosure includes a latch having a securement portion configured to couple to an access panel of the enclosure and having a rotational portion configured to rotate relative to the securement portion such that a locking portion of the rotational portion transitions between a closed configuration and an open configuration. The rotational portion includes a latch engagement recess configured to interchangeably receive a tool engagement protrusion of a tool and a handle engagement protrusion of a handle accessory. The rotational portion also includes a retainer groove defined within the latch engagement recess and configured to receive a retainer extension of the handle engagement protrusion of the handle accessory. The rotational portion is configured to actuate the locking portion of the latch assembly upon rotation of the handle accessory engaged with the latch engagement recess and upon rotation of the tool engaged with the latch engagement recess.

Other features and advantages of the present application will be apparent from the following, more detailed description of the embodiments, taken in conjunction with the accompanying drawings which illustrate, by way of example, the principles of the application.

BRIEF DESCRIPTION OF THE DRAWINGS

FIG. 3 is a perspective view of an embodiment of a portion of a latch assembly having a hexagonal engagement recess, in accordance with an aspect of the present disclosure;

FIG. 4 is a perspective view of an embodiment of a portion of a latch assembly having a circular engagement recess, in accordance with an aspect of the present disclosure; and FIG. 5 is a perspective view of an embodiment of a portion of a latch assembly having a hexagonal engagement protrusion, in accordance with an aspect of the present disclosure.

DETAILED DESCRIPTION

Figure 1:
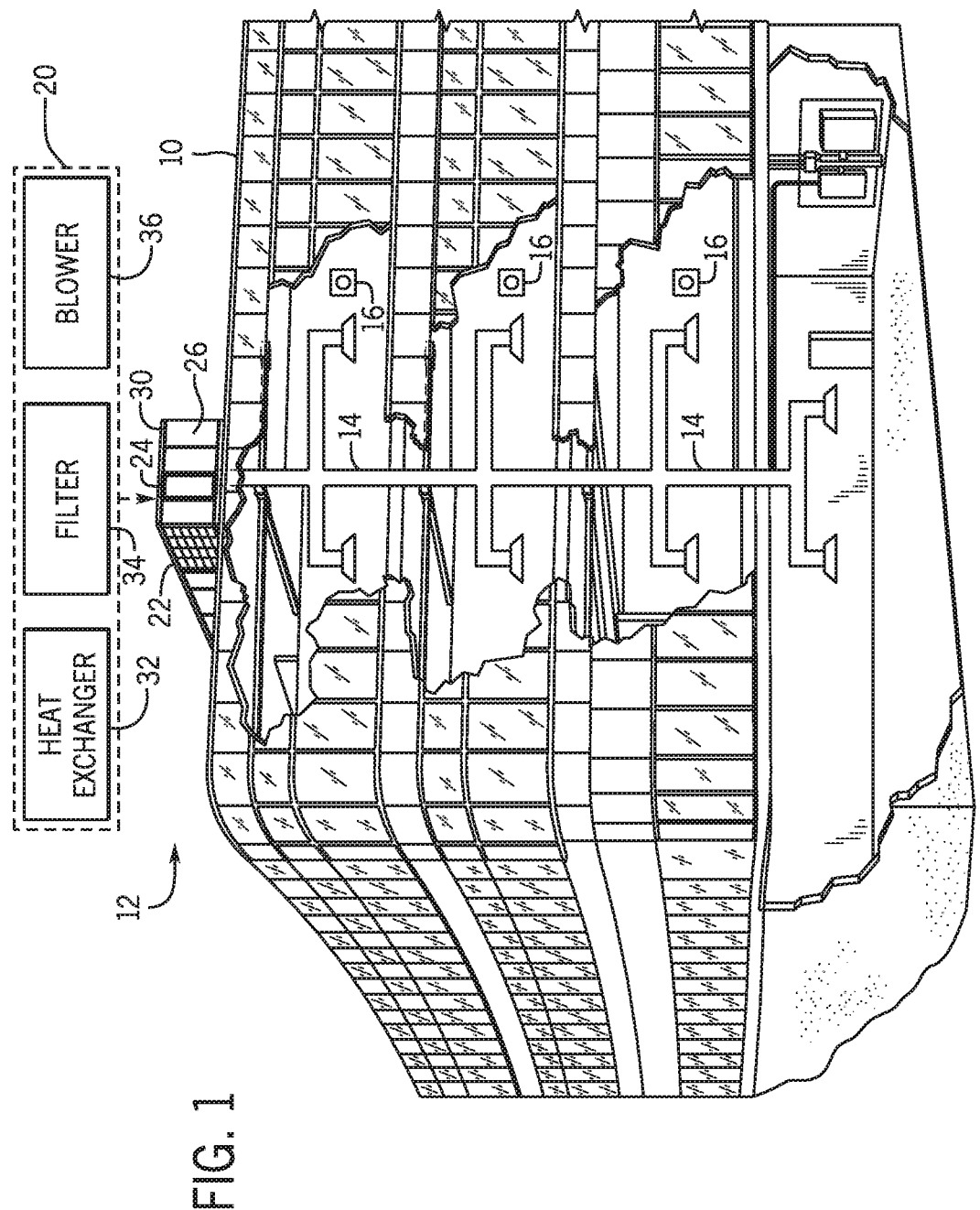
FIG. 1 is a perspective view of an embodiment of a commercial or industrial HVAC system, in accordance with an aspect of the present disclosure.

Embodiments of the present disclosure are directed toward heating, ventilation, and/or air conditioning (HVAC)

systems and convertible access panel latch assemblies for HVAC systems. Generally, the convertible access panel latch assemblies disclosed herein enable control of access to an HVAC unit, such as a rooftop unit of the HVAC systems. The HVAC unit may include heat exchangers, blowers, filters, and/or other HVAC components configured to provide conditioned air to a building. To protect the HVAC components, the HVAC unit includes an enclosure disposed around the HVAC components. The enclosure may be a rigid structure that separates the HVAC components from a surrounding environment in which the enclosure is disposed, including contaminants and debris of the surrounding environment. Additionally, an access panel providing access to an interior of the enclosure may be selectively retained in a closed position by a convertible access panel latch or convertible latch assembly, as discussed herein, to secure the HVAC components from unauthorized user access.

Depending on specifications set for the enclosure, the convertible latch assembly of the access panel is to be operable with a tool, such as a screwdriver, or without a tool, such as by hand. For example, if the enclosure is disposed on a rooftop of the building for which access is restricted by a locked door, specifications for the enclosure may stipulate that the access panel be operable by turning a handle of the convertible latch assembly, without a tool. Alternatively, if the enclosure is generally accessible to the public, specifications for the enclosure may stipulate that the access panel be operable by a specific tool that actuates the convertible latch assembly, thereby restricting access by unauthorized users.

As discussed herein, the presently disclosed convertible latch assembly is able to provide both tooled and tool-less access to the enclosure. The convertible latch assembly includes a latch core disposed through an opening of the access panel. The latch core includes a rotating closure, such as a cam, that selectively retains the access panel in a closed configuration based on actuation of an engagement receiver of the convertible latch assembly. For example, the engagement receiver of the latch core may be a specifically-shaped recess or a protrusion that may be actuated with the tool. Notably, the engagement receiver may also receive a handle accessory having a base engagement driver that actuates and couples to the engagement receiver of the latch core. As such, the handle accessory may be permanently or reversibly coupled to the latch core to convert the convertible latch assembly from tooled to tool-less access. As discussed in more detail below, latch cores of the present embodiments may be installed on each enclosure during manufacturing and may be shipped with unattached, accompanying handle accessories, such that end users may either operate the latch cores with tools or utilize the handle accessories to operate the latch cores by hand. Moreover, it is to be understood that the convertible latch assembly may be used to transform any suitable enclosure, door, or key-actuated device between tooled and tool-less access configurations. For example, the disclosed embodiments may be utilized with a door to a room of a building, a door or ignition of a vehicle, an access panel of a safe, and so forth.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

It may be desirable to access an interior of the HVAC unit 12 to perform maintenance, installations, and/or inspections of HVAC components 20 disposed within the HVAC unit 12. For example, the HVAC unit 12 of the present embodiments includes an enclosure 22, which may be a rectangular prism having an access panel 24 disposed within a side wall 26 of the enclosure 22. The access panel 24 provides access to all or a portion of the HVAC components 20 of the HVAC unit 12 disposed within the enclosure 22. In some embodiments, the access panel 24 is a rectangular element, such as a door, disposed within a similarly shaped or corresponding opening in the side wall 26. The access panel 24 may be moveable relative to the side wall 26 via hinges, rails, or any other suitable bearing elements that enable desired motion between the access panel 24 and the enclosure 22. In some embodiments, the access panel 24 may be disposed in a different surface of the enclosure 22, such as a top surface 30.

In some embodiments, the HVAC components 20 include a heat exchanger 32, a filter 34, and/or a blower 36. The HVAC components 20 may further include any suitable components of the HVAC unit 12 that would be desirably retained or secured within the enclosure 22. The HVAC components 20 are disposed within an interior of the enclosure 22, such that the access panel 24 may provide access to the HVAC components 20. That is, after opening the access panel 24, a user may access the HVAC components 20 by reaching within the interior of the enclosure 22 and/or entering the enclosure 22. In some embodiments, the access panel 24 may cover HVAC components 20 that are disposed directly underneath the access panel 24. The user may access the HVAC components 20 to perform installations within the enclosure 22, repair or perform maintenance on one or more HVAC components 20, replace one or more HVAC components 20, inspect one or more HVAC components 20, and so forth. Moreover, the access panel 24 includes a convertible latch assembly that enables the access panel 24 to be opened with tools and/or by hand, as discussed in more detail herein.

Figure 2:
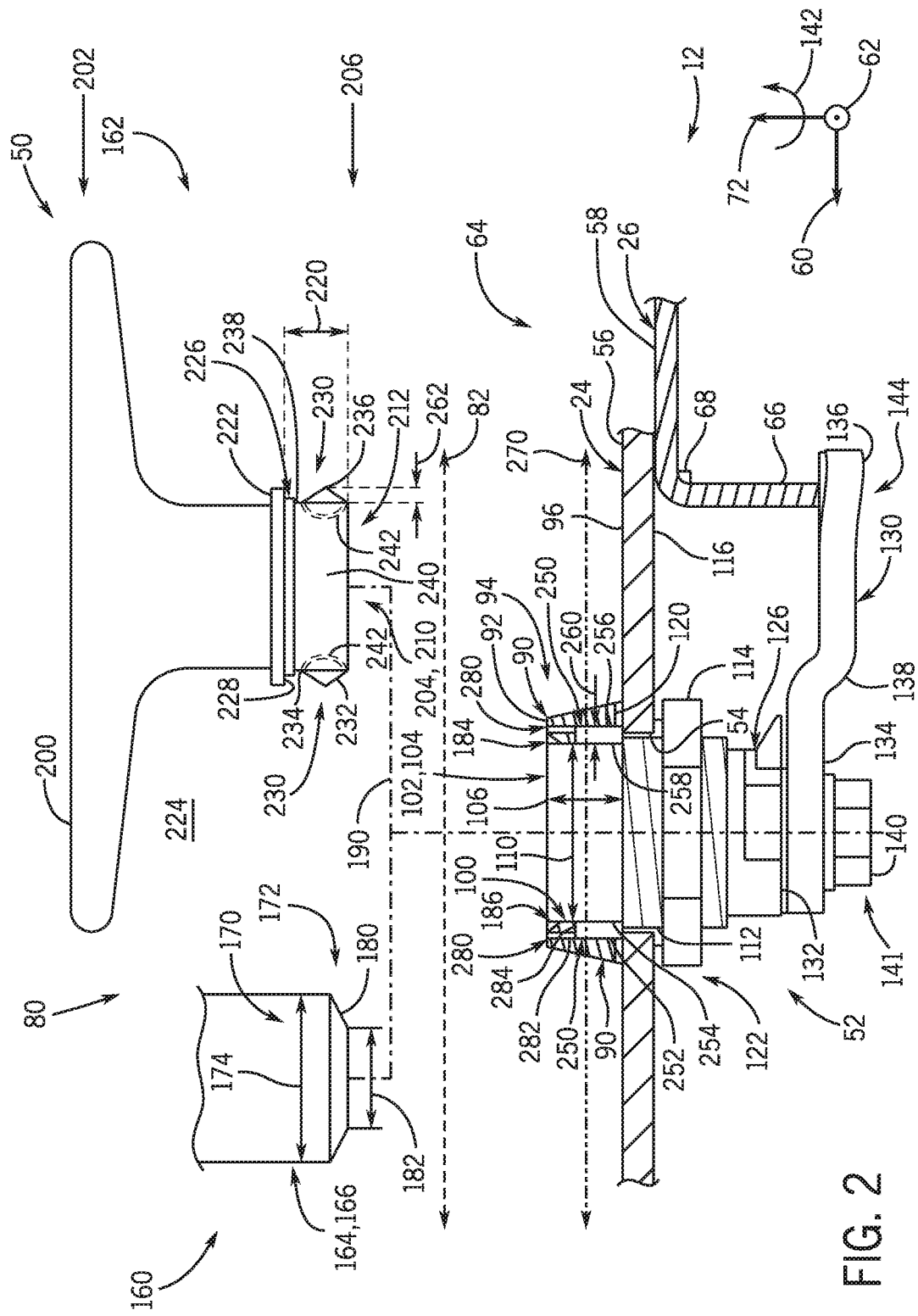
FIG. 2 is a cross-sectional side view of an embodiment of a latch assembly for an enclosure of an HVAC system, in accordance with an aspect of the present disclosure.

FIG. 2 is a cross-sectional side view of an embodiment of a convertible latch assembly 50 having a latch core 52 or latch disposed through an access panel opening 54 defined within an access panel, such as the access panel 24 of the HVAC unit 12. As illustrated, an edge portion 56 of the access panel 24 is retained or held in contact with the side wall 26, or a frame portion, of the enclosure 22. The side wall 26 of the present embodiment includes an outer surface portion 58 that generally extends along a plane defined along an x-axis 60 and a y-axis 62 and substantially coplanar to the access panel 24 in its illustrated closed configuration 64. The side wall 26 also includes an inner lip portion 66 that is disposed at an angle 68 of approximately 90 degrees relative to the outer surface portion 58, such that the inner lip portion 66 generally extends along a plane defined along a z-axis 72 and the x-axis 60.

As used herein, an angle or parameter that is approximately equal to a value refers to any suitable angle or parameter that is within approximately 5% of the value. Moreover, reference to the x-axis 60, y-axis 62, and z-axis 72 is intended to refer to the currently illustrated, installed orientation of the latch core 52, as well as the currently illustrated embodiments of actuating devices 80 or accessories, such as a tool and a handle accessory, as discussed in more detail below. When referencing proximal or distal portions of an element, proximal portions are closer to a separation plane 82 defined along the x-axis 60 and the y-axis 62 and at a position between the latch core 52 and the actuating devices 80, and distal portions are further from the separation plane 82.

The latch core 52 of the present embodiments includes several components that cooperate to selectively retain the access panel 24 in the closed configuration 64. For example, a housing 90 of the latch core 52 forms a main body thereof. A head portion 92 or drive stud is shown in cross-section and formed on a proximal end portion 94 of the housing 90 of the latch core 52, which is disposed adjacent to an environment-facing surface 96 or proximal surface of the access panel 24. In the present embodiment of the latch core 52, the head portion 92 includes internal walls 100 that collectively define a latch engagement receiver 102 or engagement feature. For example, in the present embodiment, the latch engagement receiver 102 is a latch recess 104 or latch engagement recess defined by the internal walls 100. The latch recess 104 extends into the head portion 92 by a latch recess depth 106 defined along the z-axis 72. The latch recess 104 may be a receptacle formed in any suitable geometry or shape corresponding to any suitable standard tool face, such as a slotted screw drive, a cruciform tool drive, an internal polygon screw drive, such as a hexagonal screw drive, a hexalobular tool drive, a Torx screw drive, and so forth, as discussed further below. For example, the latch recess 104 of the present embodiment includes a square-shaped socket, such that the internal walls 100 include four walls, each extending outward from the environment-facing surface 96 along the z-axis 72. The internal walls 100 of the latch recess 104 define a latch recess width 110 extending along the x-axis 60. An additional latch recess width is also defined by the internal walls 100 into the page along the y-axis 62 and is approximately equal to the illustrated latch recess width 110. In other embodiments, the latch recess 104 may be a receptacle formed in any suitable geometry or shape corresponding to any suitable non-standard tool face, such as a customized geometry. In other embodiments disclosed herein, the latch engagement receiver 102 is a selectively-shaped protrusion or male fastener, such as a head of a bolt or nut, which is actuated by an external drive or female tool. Indeed, as used herein, a receiver may be any suitable component or combination of components that receives force from or engage with a driver.

Additionally, looking to other components of the latch core 52 disposed further from the head portion 92 along the z-axis 72, a threadable body portion 112 of the latch core 52 is positioned through the access panel opening 54. In the present embodiment, the latch core 52 includes a mounting nut 114 that is threaded onto the threadable body portion 112. The mounting nut 114 may be tightened against an interior-facing surface 116 or distal surface of the access panel 24 to draw a distal surface 120 of the head portion 92 against the environment-facing surface 96 of the access panel 24. As such, the mounting nut 114 facilitates retention of the latch core 52 within the access panel opening 54. It is to be understood that the mounting nut 114, the head portion 92, and any other components of the latch core 52 that cooperate to maintain the latch core 52 within the access panel opening 54 form a securement portion 122 of the latch core 52. A detent washer 126 is also provided on the housing 90 of the latch core 52 of the present embodiment to block or prevent inadvertent rotational movement of a cam 130 of the latch core 52, which is disposed on the housing 90, in is contact with a distal face 132 of the detent washer 126. It should also be appreciated that the latch core 52 may be retained within the access panel opening 54 via other securement features, such as tabs, hooks, adhesives, an interference fit, a braze, or any other suitable feature.

The cam 130 includes a base portion 134 that is retained on the housing 90 adjacent to the detent washer 126 and includes an extension portion 136 that is protrudes from the base portion 134 and includes a bend 138 or stepped portion formed therein. In the illustrated embodiment, the extension portion 136 of the cam 130 is in contact with the inner lip portion 66 of the side wall 26 to retain the access panel 24 in the closed configuration 64. A base fastener 140 of the latch core 52 is coupled to a distal end portion 141 of the housing 90 to retain the detent washer 126 and the cam 130 on the housing 90, such as by preventing or blocking movement of these components along the z-axis 72. By interacting with the latch engagement receiver 102 of the latch core 52, a user may actuate the latch core 52 between a locked configuration, in which the cam 130 blocks or prevents opening of the access panel 24, and an unlocked configuration, in which the cam 130 is rotated along a circumferential direction 142 defined around the z-axis 72 to enable opening of the access panel 24. The cam 130, the latch engagement receiver 102, and any other components of the latch core 52 that rotate relative to the securement portion 122 of the latch core 52 form a rotatable portion 144 of the latch core 52.

As recognized herein, the latch core 52 of the convertible latch assembly 50 may be interchangeably actuated by any suitable actuating device 80, such as a tool 160 or a handle accessory 162, each of which may correlate with or correspond to the latch engagement receiver 102. Looking first to operation of the convertible latch assembly 50 with the tool 160, the tool 160 may be any suitable screwdriver or key having a tool engagement driver 164 that actuates the latch engagement receiver 102. As used herein, a driver is any suitable component or combination of components that engages with and/or enables transmission of force to a receiver. Moreover, for clarity and unless otherwise specified or implied, terms that begin with "latch," such as "latch engagement receiver," refer to components of the latch core 52, terms that begin with "tool" refer to components of the tool 160, and terms that begin with "handle" refer to components of the handle accessory 162.

The illustrated embodiment of the tool 160 includes the tool engagement driver 164, which is an "internal" drive or a male drive, which engages with and actuates the latch recess 104 of the latch engagement receiver 102. That is, the tool engagement driver 164 includes a tool protrusion 166 defined by external walls 170 of a proximal end portion 172 of the tool 160. In the illustrated embodiment, the tool protrusion 166 is a square-shaped protrusion, such as that of a square screw drive, which mates with or engages the latch recess 104 of the latch engagement receiver 102. For the currently illustrated embodiment of the convertible latch assembly 50, the tool protrusion 166 therefore includes a tool protrusion width 174 defined along the x-axis 60 that is generally equal to the latch recess width 110. Further, the tool protrusion 166 includes an additional tool protrusion width defined into the page along the y-axis 62 that is generally equal to the additional latch recess width mentioned above. In other embodiments, the tool 160 may be an external drive having a tool engagement driver 164 that defines a base recess or socket for receiving a protrusion of the latch core 52.

Additionally, as illustrated, the proximal end portion 172 of the tool 160 includes chamfered edges 180 that taper or narrow from the tool protrusion width 174 to a relatively smaller, distal tool protrusion width 182 that facilitates insertion of the tool 160 into the latch core 52. The latch core 52 similarly includes chamfered edges 184 formed in proximal edge portions 186 of the internal walls 100. In other embodiments, one or both of the chamfered edges 180, 184 may be replaced by squared edges, fillets, bevels, and so forth. In any case, after a user inserts the tool protrusion 166 of the tool 160 into the latch recess 104 along an engagement linking axis 190, the user may rotate the tool 160 in the circumferential direction 142 to rotate the cam 130 relative to the access panel 24. In other words, upon rotation of the tool 160, the tool engagement driver 164 applies force to rotate the latch engagement receiver 102 of the head portion 92 of the latch core 52 along the circumferential direction 142, which similarly rotates the cam 130 out of engagement with the inner lip portion 66. Thus, based on actuation via the tool 160, the latch core 52 is moveable to an unlocked position that enables the user to open the access panel 24 to an open configuration.

Moreover, using the illustrated handle accessory 162, the user may operate the latch core 52 in a similar manner to operation of the latch core 52 with the tool 160. For example, the handle accessory 162 of the present embodiment includes a hand grip 200 or handle portion defined at a distal end portion 202 of the handle accessory 162, opposed from a handle engagement driver 204 defined at a proximal end portion 206 of the handle accessory 162. The hand grip 200 is a T-handle, though the handle accessory 162 may alternatively have any other suitable shape that enables the user to apply torque by hand. The handle engagement driver 204 is generally equivalent to the tool engagement driver 164 of the tool 160, and thus also corresponds to the latch engagement receiver 102. As such, the handle engagement driver 204 of the present embodiment includes a handle protrusion 210 or handle engagement protrusion. The handle protrusion 210 is an extended portion having a square-shaped, internal drive formed by external walls 212 of the proximal end portion 206 of the handle accessory 162. However, the handle protrusion 210 may be any suitable extended portion shaped as any suitable standard tool face, such as one having a triangular shape, a rectangular shape, a hexagonal shape, a double-bit shape, or a star shape corresponding to a shape of the latch engagement receiver 102. In other embodiments, the handle protrusion 210 may be a non-standard, specialized, or custom-shaped extended portion. Similar to the tool engagement driver 164, the handle engagement driver 204 may therefore be inserted into or disposed into contact with the latch engagement receiver 102 along the engagement linking axis 190 to enable the user to actuate the latch core 52 between locked and unlocked configurations.

The handle protrusion 210 of the handle engagement driver 204 has a handle protrusion length 220 defined along the z-axis 72 that is as long as or longer than the latch recess depth 106 of the latch recess 104. Additionally, in the present embodiment, the handle accessory 162 includes a circumferential sealing shoulder 222 that, when the handle accessory 162 is engaged with the latch core 52, facilitates sealing of the latch recess 104 of the latch core 52 from a surrounding environment 224. A sealing gasket 226 is also illustrated in contact with a proximal-facing surface 228 of the circumferential sealing shoulder 222, which may be squeezed or compressed between the circumferential sealing shoulder 222 and the latch core 52 to provide further enhanced sealing therebetween. In other embodiments, one or both of the circumferential sealing shoulder 222 and the sealing gasket 226 are omitted.

Generally, the handle accessory 162 may be disposed in, retained in, or coupled to the latch core 52 to convert the access panel 24 from a tooled to tool-less access configuration, which enables the access panel 24 to be manually opened by manipulating the handle accessory 162. In some embodiments, the handle accessory 162 is a snap-in handle accessory. In the present embodiment, the latch core 52 and the handle accessory 162 each include connector or retainer portions that correspond to one another to facilitate retention of the handle accessory 162 within the latch core 52. For example, the handle accessory 162 includes two handle retainers 230, such as a first retainer protrusion 232 or lateral protrusion extending from a first external wall 234 of the external walls 212 of the handle protrusion 210 and a second retainer protrusion 236 or lateral protrusion extending from a second external wall 238 of the external walls 212 of the handle protrusion 210. The first retainer protrusion 232 and the second retainer protrusion 236 are disposed opposite one another relative to the handle protrusion 210. The retainer protrusions 232, 236 are each shaped as having triangular profiles, each having a rectangular base that is coupled to the corresponding external wall 234, 238, as well as two triangular faces that bound the retainer protrusions 232, 236. In other embodiments, the retainer protrusions 232, 236 may each have a circular cross-section, a semi-circular cross-section, a rectangular cross-section, or any other suitable geometry or contour. An illustrated third wall 240 of the handle protrusion 210 and an opposed, fourth wall do not include retainer protrusions in the present embodiment.

The retainer protrusions 232, 236 may be formed of any suitable material, such as polymer or rubber, but are preferably flexible in response to a normal, user-applicable force, such as a force of 100 Newtons (N), 200 N, 300 N, 400 N, and so forth. However, in some embodiments, the internal walls 100 defining the latch recess 104 of the latch engagement receiver 102 may be flexible, and the retainer protrusions 232, 236 may be formed of a more rigid or less flexible material, such as metal. The retainer protrusions 232, 236 are separately formed and attached to the handle protrusion 210 by any suitable adhesive or fastener, though in other embodiments, the retainer protrusions 232, 236 are integrally formed with the handle protrusion 210, such as by molding. Additionally, the handle accessory 162 may include perimeter grooves 242 or compression grooves defined around all or a portion of a perimeter of the handle protrusion 210 for receiving the retainer protrusions 232, 236 therein. In such embodiments, during insertion of the handle accessory 162 into the latch core 52, the retainer protrusions 232, 236 may be compressed into the perimeter grooves 242 by the internal walls 100 of the latch core 52, which may include the chamfered edges 184 to facilitate compression of the retainer protrusions 232, 236 during insertion of the handle accessory 162.

To receive the retainer protrusions 232, 236 of the handle retainers 230, the latch core 52 includes two corresponding latch retainers 250, which are adjacent to the latch engagement receiver 102. As illustrated, the latch retainers 250 include a first retainer groove 252 recessed within a first wall 254 of the internal walls 100 of the latch core 52 and a second retainer groove 256 recessed within a second wall 258 of the internal walls 100. During insertion of the handle accessory 162 into the latch core 52, the retainer protrusions 232, 236 are initially compressed by the internal walls 100 of the latch recess 104, or in embodiments having them, by the chamfered edges 184 of the latch core 52. Once inserted to a sufficient depth, the compressed retainer protrusions 232, 236 may expand into an open volume provided by the retainer grooves 252, 256. The open volume of each latch retainer 250 may include a latch retainer width 260 that is as large as a handle retainer width 262 of the retainer protrusions 232, 236 of the handle accessory 162, in some embodiments. The latch retainers 250 have a rectangular cross-section in the illustrated embodiment, but may have any suitable shape or cross-section for receiving the retainer protrusions 232, 236, such as a semi-circular cross-section, a triangular cross-section, and so forth. Other embodiments of the convertible latch assembly 50 may include a handle accessory 162 with one retainer protrusion 232, 236 defined on one of the external walls 212 of the handle protrusion 210, which is received within one corresponding latch retainer 250. In other embodiments, the retainer protrusions 232, 236 may extend from each external wall 212 or around a full perimeter of the handle protrusion 210. The retainer protrusions 232, 236 of these embodiments may be received within corresponding latch retainers 250 defined within a full perimeter of the latch recess 104.

Accordingly, the handle engagement driver 204 of the handle accessory 162 may be coupled to the latch engagement receiver 102 of the latch core 52 by the handle retainers 230 and the latch retainers 250, which engage along a retainment linking axis 270. For the present embodiment, the retainment linking axis 270 is aligned along the x-axis 60, which is crosswise or transverse to the engagement linking axis 190 discussed above. More particularly, physical interference provided by the retainer protrusions 232, 236 within the retainer grooves 252, 256 blocks or prevents removal, such as inadvertent removal, of the handle protrusion 210 of the handle accessory 162 from the latch recess 104 of the latch core 52 along the z-axis 72, thereby transforming the otherwise tool-accessible latch core 52 to be hand-operable via torque applied to the hand grip 200. In some embodiments, the handle accessory 162 is permanently coupled to the latch core 52, such that dismantlement of the latch core 52 or the handle accessory 162 is performed to remove the handle accessory 162.

The convertible latch assembly 50 may include certain components to facilitate reversible removal of the handle accessory 162 from the latch core 52. For example, in the present embodiment, two access channels 280 are defined by internal walls 282 of the head portion 92 of the latch core 52. The access channels 280 each extend along the z-axis 72 between the proximal end portion 94 or surface of the head portion 92 and a top wall 284 of one of the retainer groove 252, 256. In other embodiments, the access channels 280 may extend along the x-axis 60 to couple an external lateral surface of the head portion 92 and a side wall of each retainer groove 252, 256. The access channels 280 may have any suitable shape or cross-section, such as a triangular, circular, or rectangular cross-section. To recompress and remove the retainer protrusions 232, 236 from the corresponding retainer grooves 252, 256, the user may insert a pin or another suitable disengagement device into each access channel 280. While pressing against the retainer protrusions 232, 236 with the disengagement device(s) inserted into access channels 280, the user may pull the handle accessory 162 outward from the access panel 24 along the z-axis 72 to remove the handle accessory 162. As such, the latch core 52 may be converted back into tooled access, which enables the user to use the tool 160 for subsequent actuation of the latch core 52.

In other embodiments, the handle accessory 162 excludes the handle retainer 230 and/or the latch core 52 excludes the latch retainer 250, such that the handle accessory 162 may be reversibly received by the latch core 52, utilized to manually actuate the latch core 52 as an ergonomic embodiment of the tool, and then removed after use. In some of these embodiments, a spacing between the internal walls 100 of the latch engagement receiver 102 and the external walls 212 of the handle engagement driver 204 is suitably small so that the handle accessory 162 may be interference-fitted or coupled to the latch core 52 without the retainers 230, 250. The handle accessory 162 may additionally include chamfered edges in some of these embodiments to facilitate insertion of the handle accessory 162 within the latch core 52. In these embodiments, the user may hand-operate the latch core 52 by applying torque in the circumferential direction 142 to the latch core 52, and may then remove the handle accessory 162 from the latch core 52 via application of force along the z-axis 72. Further, it is to be understood that these components and other components of the convertible latch assembly 50 discussed herein may be selectively combined in any suitable manner.

FIG. 3 is a perspective view of an embodiment of the convertible latch assembly 50, in which the handle accessory 162 includes a hexagon-shaped embodiment of the handle protrusion 210 as the handle engagement driver 204. The handle accessory 162 also includes any suitable hand grip, from which the handle protrusion 210 extends. The handle protrusion 210 may also be referred to as an internal hex drive having a hexagonal tool face 320, in some embodiments. The latch engagement receiver 102 of the latch core 52, which is illustrated as removed from the access panel 24 for clarity, includes a hexagon-shaped embodiment of the latch recess 104. As such, the user may actuate the latch core 52 via a suitable hex key or another suitable tool having a tool engagement driver that corresponds to the latch engagement receiver 102. Indeed, it is to be understood that a corresponding tool engagement driver of a tool may include the same or similar components to the handle engagement driver 204 described herein with reference to FIGS. 3-5. Moreover, by inserting the handle protrusion 210 of the handle accessory 162 into the latch recess 104, the user may apply toque to selectively rotate the cam 130 along the circumferential direction 142 to open and close the access panel 24.

Moreover, the present embodiment of the handle protrusion 210 includes an embodiment of the handle retainer 230 having a retainer protrusion 322 formed around a full perimeter 324 of the handle protrusion 210. As discussed above with reference to the retainer protrusions 232, 236 of FIG. 2, the retainer protrusion 322 of the illustrated embodiment may be any flexible material having any suitable shape. The internal walls 100 of the latch recess 104 similarly define a retainer groove 340, extending around a full perimeter 344 of the latch recess 104, as the latch retainer 250 for receiving the retainer protrusion 322 therein. Thus, upon insertion of the handle protrusion 210 into the latch recess 104, the retainer protrusion 322 may engage with or snap into the retainer groove 340 to couple the handle accessory 162 to the latch core 52. Then, as discussed above, the handle accessory 162 enables manual actuation of the latch core 52 upon rotation of the handle accessory 162.

FIG. 4 is a perspective view of an embodiment of the convertible latch assembly 50 in which the handle protrusion 210 of the handle accessory 162 is a shaft having a circular cross-section and a corresponding non-standard tool face or circular tool face 380. As illustrated, the handle protrusion 210 includes an embodiment of the handle retainer 230 which extends around a partial circumference of the handle protrusion 210. The handle retainer 230 is a retainer protrusion 382 shaped as a triangular prism and having a first exposed face 384 or end face separated from a second exposed face 386 by an arc length 388. The handle retainer 230 is separated from the circular tool face 380 of the handle engagement driver 204 by a retainer separation distance 390, which may facilitate dispersion of force during assembly and use of the convertible latch assembly 50.

The corresponding latch engagement receiver 102 includes an embodiment of the latch recess 104 with a circular cross-section or shape. Moreover, the internal wall 100 of the latch core 52 defines a retainer groove 400 as the latch retainer 250. The retainer groove 400 includes an arc length that corresponds to the arc length 388 of the retainer protrusion 382, with circumferential ends respectively bounded by a first internal face 402 and a second internal face 404. In some embodiments, the arc length of the retainer groove 400 may be longer than the arc length 388 of the retainer protrusion 382. The handle protrusion 210 may therefore be inserted into the latch recess 104, which causes compression of the retainer protrusion 382. When the retainer protrusion 382 is aligned with the retainer groove 400 along the z-axis 72 and in the circumferential direction 142, the retainer protrusion 382 may expand into the retainer groove 400 to retain the handle accessory 162 to the latch core 52.

Additionally, during rotation of the handle accessory 162 along an opposite circumferential direction 410 defined around the z-axis 72, the first exposed face 384 of the retainer protrusion 382 transmits torque from the user to the first internal face 402 of the retainer groove 400, thereby causing rotation of the cam 130 along the opposite circumferential direction 410. Similarly, during rotation of the handle accessory 162 in the circumferential direction 142, the second exposed face 386 of the retainer protrusion 382 applies the torque from the user to the second internal face 404 of the retainer groove 400 to rotate the cam 130 in the circumferential direction 142. In this manner, the latch retainer 250 and the handle retainer 230 may cooperate to enable the circular-shaped handle protrusion 210 to actuate the latch core 52. Because the latch core 52 having the circularly-shaped latch recess 104 may not be actuatable by a standardized or generally circular tool or key without a retainer protrusion of appropriate dimensions, such as arc length, the present embodiment of the convertible latch assembly 50 may desirably provide increased security to the convertible latch assembly 50. However, it is to be understood that the latch core 52 may be interchangeably actuated by the handle accessory 162 and any suitable tool having a tool engagement driver and lateral protrusion that corresponds to the latch engagement receiver 102.

FIG. 5 is a perspective view of an embodiment of the convertible latch assembly 50 in which the latch engagement receiver 102 of the latch core 52 includes a latch protrusion 440 or latch engagement protrusion. The latch protrusion 440 may be an extended portion including any standard tool face, such as the presently illustrated hexagonal tool face 442 defined by external surfaces 444 of the latch core 52. In other embodiments, the latch protrusion 440 may be an extended portion having a non-standard, specialized, or customized tool face or geometry. As illustrated, the latch protrusion 440 of the present embodiment is a hexagon-shaped extension that is coupled to the head portion 92 of the latch core 52, though in other embodiments, the latch protrusion 440 may replace the head portion 92 of the latch core 52 and may be in direct contact with the access panel 24. Compared to embodiments in which the latch core 52 includes recesses and/or grooves therein, the latch core 52 having the latch protrusion 440 may retain less moisture and be more corrosion resistant in certain conditions or environments. The latch protrusion 440 may generally correspond to a bolt head or have a bolt head geometry, in some embodiments.

To actuate the latch core 52, the user may use a suitable tool having a tool engagement driver that corresponds to the latch engagement receiver 102. For example, the user may use a wrench or socket having an opening sized to match the latch protrusion 440. For tool-less access, the user may instead dispose the handle accessory 162 onto the latch protrusion 440. The illustrated embodiment of the handle accessory 162 includes a handle recess 450 or handle engagement recess as the handle engagement driver 204. The handle recess 450 may be any suitable standard tool receptacle or non-standard tool receptacle, such as one that corresponds to an external drive that actuates outer boundaries of the latch engagement receiver 102. That is, internal walls 452 of the handle accessory 162 define a hexagon-shaped receptacle or socket which may fit over and/or engage with the latch protrusion 440. A handle recess depth 454 is defined between a proximal handle face 456 of the handle accessory 162 and a distal internal wall 458 of the handle accessory 162. However, in other embodiments, the handle recess 450 may be any suitable non-standard or customized tool receptacle or geometry.

To enable coupling between the handle accessory 162 and the latch core 52, the latch core 52 includes a retainer protrusion 470 as the latch retainer 250. The retainer protrusion 470 in the illustrated embodiment is a triangular prism-shaped lateral protrusion extending from a side surface 472 of the latch protrusion 440. As such, the retainer protrusion 470 extends from and is adjacent to the latch engagement receiver 102 in the present embodiment. In other embodiments, any suitable quantity of latch protrusions may be formed in any suitable positions on the latch core 52. The handle accessory 162 includes a corresponding retainer groove 480 as the handle retainer 230. For example, the retainer groove 480 is recessed within one of the internal walls 452 of the handle recess 450. Upon disposal of the handle recess 450 over the latch protrusion 440, the retainer groove 480 may expand into the retainer groove 480 to engage or snap into the retainer groove 480 and convert the latch core 52 from tooled to manual access.

It is to be understood that an access channel for receiving a pin or other disengagement device may also be formed within or near the proximal handle face 456 of the handle engagement driver 204 to enable disengagement of the retainers 230, 250. In some embodiments in which the retainers 230, 250 do not extend around a full perimeter of the latch engagement receiver 102 and the handle engagement driver 204, the retainer groove 480 may be a through-hole that extends between a portion of the internal walls 452 of the handle recess 450 and corresponding external surfaces of the handle engagement driver 204. In these embodiments, the user may manually compress the retainer protrusion 470 while applying a pulling force to the handle accessory 162 along the z-axis 72 to disengage the retainers 230, 250 from one another. Thus, the handle accessory 162 may be efficiently coupled to or removed from the latch core 52 to convert the convertible latch assembly 50 between manual to tooled access.

Accordingly, the present disclosure is directed to a convertible latch assembly including a latch core that may be utilized for tooled or tool-less actuation of access panels. The latch core may be installed on or adjacent to an access panel, such as an access panel of an HVAC unit enclosure, to selectively prevent or block opening of the access panel based on user actuation by a tool or by hand. For example, the latch core includes a latch engagement receiver that may be actuated by a tool having a tool engagement driver. Additionally, the latch engagement receiver may be actuated by a handle accessory having a handle engagement driver that is identical or similar to the tool engagement driver, such as identical or similar in geometry or contour. For example, the latch engagement receiver may be a hexagonal socket, and the tool engagement driver and the handle engagement driver may each be a corresponding hexagonal screw drive. Alternatively, the latch engagement receiver may be a hexagonal protrusion, and the tool engagement driver and the handle engagement driver may be a corresponding hexagonal socket. Further, the latch core and the handle accessory may include corresponding retainers that enable the handle accessory to be coupled to or snapped into the latch core. With the handle engagement driver of the handle accessory coupled to the latch engagement receiver, the convertible latch assembly disclosed herein may be converted from tooled to tool-less access. As such, the convertible latch assembly enables a reduction in specific parts for manufacturing enclosures having different access specifications.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A latch assembly for a heating, ventilation, and/or air conditioning (HVAC) enclosure, comprising:
a latch having a securement portion configured to couple to an access panel of the enclosure and having a rotational portion, wherein the rotational portion has an engagement feature configured to engage with a tool face or a tool receptacle and has a first retainer adjacent to the engagement feature, wherein the rotational portion is configured to rotate relative to the securement portion such that a locking portion of the rotational portion transitions between a closed configuration and an open configuration; and
a handle accessory having a handle engagement driver configured to engage with the engagement feature of the rotational portion along a first linking axis and having a second retainer configured to be compressed along a second linking axis, transverse to the first linking axis, relative to the handle engagement driver to couple with the first retainer.

2. The latch assembly of claim 1, wherein the tool face is a non-standard tool face or the tool receptacle is a non-standard tool receptacle.

3. The latch assembly of claim 1, wherein the engagement feature extends from a body of the rotational portion and has the tool face, and wherein the handle engagement driver has a recess defined within the handle accessory and having the tool receptacle.

4. The latch assembly of claim 3, wherein the tool face is a hexagonal drive, and wherein the tool receptacle is a hexagonal socket.

5. The latch assembly of claim 1, wherein the engagement feature has a recess defined within the rotational portion and having the tool receptacle, and wherein the handle engagement driver of the handle accessory has an extension protruding therefrom and having the tool face.

6. The latch assembly of claim 5, wherein the first retainer is a groove defined within a surface of the recess, wherein the second retainer is a lateral protrusion from the extension of the handle accessory, and wherein the lateral protrusion is configured to engage with the groove.

7. The latch assembly of claim 6, wherein the groove is formed around a full perimeter of the recess in the rotational portion.

8. The latch assembly of claim 6, wherein the latch has an access channel formed between an exterior surface of the rotational portion and the surface of the recess, wherein the access channel is adjacent to the groove, and wherein the access channel is configured to receive a disengagement device to enable disengagement of the lateral protrusion from the groove.

9. The latch assembly of claim 1, wherein the rotational portion has a third retainer, wherein the handle accessory has a fourth retainer configured to engage with the third retainer, and wherein the second retainer of the handle accessory is disposed on an opposite side of the handle engagement driver from the fourth retainer.

10. The latch assembly of claim 1, wherein the locking portion has a cam, and wherein the latch is configured to rotate the cam between the closed configuration that blocks actuation of the access panel and the open configuration that enables actuation of the access panel.

11. The latch assembly of claim 1, wherein the tool face is a standard tool face having a triangular shape, a rectangular shape, a hexagonal shape, a double-bit shape, or a star shape.

12. A latch assembly for a heating, ventilation, and/or air conditioning (HVAC) enclosure, comprising:
   a latch having a securement portion configured to couple to an access panel of the enclosure and a rotational portion having an engagement receptacle and a retainer groove defined in a surface of the engagement receptacle, wherein the rotational portion is configured to rotate relative to the securement portion such that a locking portion of the rotational portion transitions between a closed configuration and an open configuration; and
   a handle accessory having a handle portion with an engagement extension protruding therefrom, wherein the engagement extension has a retainer extension protruding therefrom, wherein the engagement extension is configured to engage with the engagement receptacle along a first linking axis, and wherein the retainer extension is configured to move relative to the engagement extension along a second linking axis, transverse to the first linking axis, to couple with the retainer groove.

13. The latch assembly of claim 12, wherein the engagement extension has a circular cross-section, wherein the retainer extension is formed around a partial circumference of the engagement extension, and wherein the retainer extension has an end face configured to apply torque to an end face of the retainer groove to enable rotation of the rotational portion.

14. The latch assembly of claim 12, wherein the engagement extension has a non-standard tool face.

15. The latch assembly of claim 12, wherein the retainer extension is formed around a full perimeter of the engagement extension.

16. The latch assembly of claim 12, wherein the engagement receptacle of the rotational portion has chamfered edges to facilitate insertion of the engagement extension.

17. The latch assembly of claim 12, wherein the handle accessory comprises:
   a circumferential sealing shoulder formed between the handle portion and the engagement extension; and
   a sealing gasket disposed between the circumferential sealing shoulder and the engagement extension, wherein the sealing gasket is configured to be compressed between the circumferential sealing shoulder and the rotational portion.

18. A latch assembly for a heating, ventilation, and/or air conditioning (HVAC) enclosure, comprising:
   a latch having a securement portion configured to couple to an access panel of the enclosure and having a rotational portion configured to rotate relative to the securement portion such that a locking portion of the rotational portion transitions between a closed configuration and an open configuration, wherein the rotational portion comprises:
      a latch engagement recess configured to interchangeably receive a tool engagement protrusion of a tool and a handle engagement protrusion of a handle accessory; and
      a retainer groove defined within the latch engagement recess and configured to receive a retainer extension of the handle engagement protrusion of the handle accessory via a snap fit to enable removable coupling of the handle accessory to the latch, wherein the rotational portion is configured to actuate the locking portion of the latch assembly upon rotation of the handle accessory engaged with the latch engagement recess and upon rotation of the tool engaged with the latch engagement recess.

19. The latch assembly of claim 18, wherein the latch has a plurality of interior walls defining the latch engagement recess, wherein the plurality of interior walls cooperatively defines a geometry configured to interchangeably engage with the tool engagement protrusion of the tool and the handle engagement protrusion of the handle accessory, and wherein the retainer groove is formed in an interior wall of the plurality of interior walls.

20. The latch assembly of claim 18, wherein the HVAC enclosure comprises a rooftop unit enclosure, and wherein the latch assembly is configured to control access to a heat exchanger disposed within an interior of the rooftop unit enclosure.

21. The latch assembly of claim 18, comprising the handle accessory, wherein the handle engagement protrusion of the handle accessory is configured to be retained within the latch engagement recess to enable manual actuation of the locking portion of the latch assembly.

22. The latch assembly of claim 18, comprising a compression groove formed in an external surface of the handle engagement protrusion of the handle accessory, wherein the retainer extension is positioned within the compression groove.

23. The latch assembly of claim 22, wherein the retainer extension is configured to compress into the compression groove upon insertion of the handle accessory into the latch engagement recess, and wherein the retainer extension is configured to expand into the retainer groove of the latch engagement recess to retain the handle accessory to the latch.

24. The latch assembly of claim 18, wherein the tool engagement protrusion and the handle engagement protrusion each correspond to a standard tool face.

* * * * *